US005438741A

United States Patent [19]

Ni

[11] Patent Number: 5,438,741

[45] Date of Patent: Aug. 8, 1995

[54] TIE ROD MOUNTING/DETACHING DEVICE

[76] Inventor: Ching L. Ni, No. 86, Tien Mei, 5 Lin, Tien Mei Tsun, Nan Chuang Hsiang, Miao Li Hsien, Taiwan

[21] Appl. No.: 173,772

[22] Filed: Dec. 22, 1993

[51] Int. Cl.[6] .............................................. B23P 19/04

[52] U.S. Cl. .............................................. 29/240; 29/282

[58] Field of Search ....................... 279/51, 52, 58, 59; 81/90.1, 90.2, 128; 294/19.1, 24, 99.1, 99.2, 100; 29/240, 263, 282

[56] References Cited

U.S. PATENT DOCUMENTS

| | | | |
|---|---|---|---|
| 1,177,843 | 4/1916 | Ackerman et al. | 29/263 |
| 2,061,086 | 11/1936 | Nord | 279/58 |
| 2,478,382 | 8/1949 | Fischer | 279/58 |
| 3,350,108 | 10/1967 | Troka | 279/58 |
| 4,059,883 | 11/1977 | Osborne | 29/263 |
| 5,052,250 | 10/1991 | Clarke et al. | 81/128 |

*Primary Examiner*—Robert C. Watson

*Attorney, Agent, or Firm*—Hamilton, Brook, Smith & Reynolds; James M. Smith

[57] ABSTRACT

A device for mounting/detaching a tie rod of a vehicle steering arrangement includes an outer tube having a first end with a threaded outer periphery and a second end, an inner tube rotatably received in the outer tube and having a first end partially received in the first end of the outer tube and a second end extending beyond the second end of the outer tube, and an operative member securely attached to the second end of the inner tube for rotating the latter. A chuck is received in the first end of the inner tube for releasably holding an end of a tie rod. A sleeve is mounted around the first end of the outer tube and includes an actuating member in one end thereof for effecting opening and closing of the chuck and an inner periphery having a threaded section which engages with the threaded first end of the outer tube, such that when the outer tube rotates, the sleeve moves on the threaded first end of the outer tube along an axial direction of the outer tube to move the chuck between an opened status and a closed status.

6 Claims, 4 Drawing Sheets

TIE ROD MOUNTING/DETACHING DEVICE

BACKGROUND OF THE INVENTION

1. Field of the Invention

The present invention relates to a device for mounting/detaching tie rods of a vehicle steering arrangement.

2. Description of Related Art

In modern vehicles, in addition to the steering arrangement, there is a variety of devices mounted under the engine hood, such as engine, fuel injection system, battery, water tank, fan, air conditioning arrangement, etc., which renders a difficulty to the maintenance of the steering arrangement, especially in the tie rods thereof. In conventional automobile designs, in each of two fenders which define a space for accommodating the above-mentioned devices, a slit is formed where the tie rod extends, such slit is sufficiently large for the hands of the maintenance worker to pass therethrough so as to mount or detach the tie rod by wrenches. Nowadays, the maintenance worker can only gain access to the tie rods via a relatively narrow passage under the engine hood since said slit in modern automobile design becomes so narrow that the hands are not passable therethrough, incurring more difficulty to the maintenance of the tie rods. The present invention provides a device which may permit access to the tie rods via said narrow slit to provide convenient maintenance therefor.

SUMMARY OF THE INVENTION

The present invention provides a device for mounting/detaching a tie rod of a vehicle steering arrangement, the device comprising an outer tube and inner tube. The outer tube has first end with a threaded outer periphery and a second end. The inner tube is rotatably received in the outer tube and has a first end partially received in the first end of the outer tube and a second end extending beyond the second end of the outer tube. A chuck is movably received in the first end of the inner tube for releasably holding an end of a tie rod. A compression-spring is mounted in the first end of the inner tube and positioned adjacent to the chuck.

A sleeve is mounted around the first end of the outer tube and includes a flange projecting inwardly from an end thereof for controlling opening and closing of the chuck. An inner periphery of the sleeve includes a threaded section which engages with the threaded first end of the outer tube, such that when the outer tube rotates, the sleeve moves on the threaded first end of the outer tube along an axial direction of the outer tube to move the chuck between a first position of an opened status and a second position of a closed status under actuation of the flange.

Preferably, the first end of the inner tube includes a second flange thereon which extends beyond the first end of the outer tube. The second flange includes a plurality of circumferentially spaced grooves extending along an axial direction of the inner tube and has an outer diameter the same as that of the first end of the outer tube. The inner periphery of the sleeve has a channeled section for engaging with the second flange on the first end of the inner tube to prevent rotational movement therebetween.

The first end of the inner tube has a plurality of protrusions projecting inwardly from an inner periphery thereof. The chuck includes a relatively smaller end and a relatively larger end and has a plurality of circumferentially spaced guiding grooves which are formed in an outer periphery thereof and which extend from the relatively smaller end to the relatively larger end for engaging with the protrusions on the inner periphery of the first end of the inner tube, the relatively larger end including a plurality of circumferentially spaced longitudinal slits formed therein and a rough inner peripheral surface for catching the end of the tie rod.

Rotation of the outer tube may urge the chuck to hold or release the ball joint of the tie rod, and rotation of the inner tube may connect or disconnect the tie rod with the rack when the ball joint is securely held by the chuck. Such a device allows the maintenance worker to operate via said slit which is more convenient than operation from the space under the engine hood.

Other objects, advantages, and novel features of the invention will become more apparent from the following detailed description when taken in conjunction with the accompanying drawings.

DESCRIPTION OF THE PREFERRED EMBODIMENT

Figure 1:
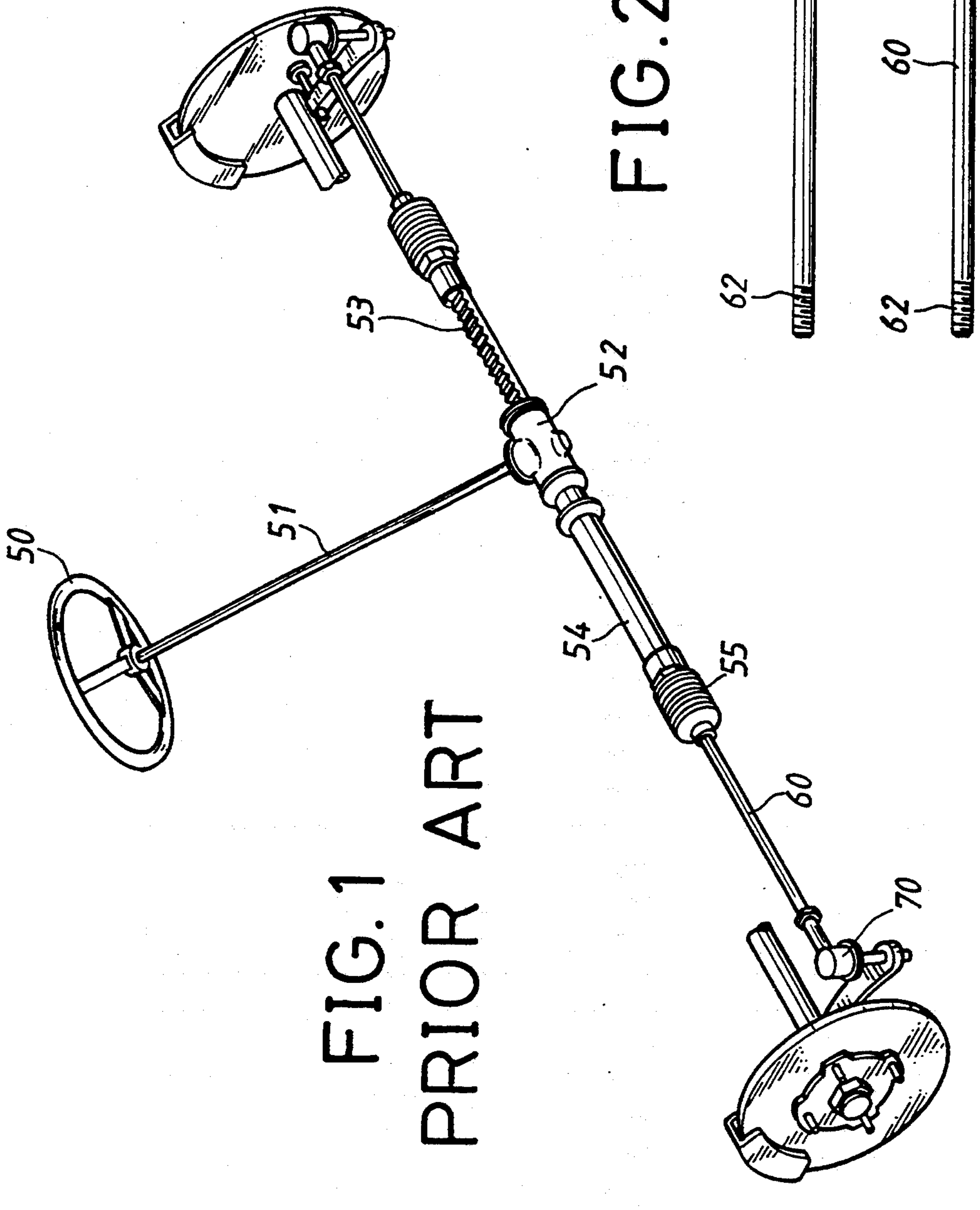
FIG. 1 PRIOR ART
FIG. 1 is a perspective view of a steering arrangement according to prior art.
Figure 2:
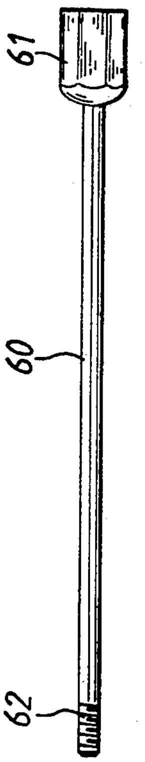
FIG. 2 PRIOR ART
FIGS. 2 and 3 are elevational views showing two conventional tie rod of different designs.
Figure 3:
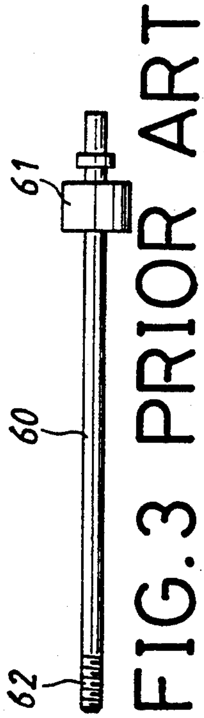
FIG. 3 PRIOR ART

Referring to FIG. 1, a steering arrangement for a vehicle generally includes a steering wheel 50, a steering column 51, a steering box 52, a rack 53, a rack post 54, a pair of tie rods 60 each have a first end connected to a ball joint 70 and a second end connected to an end of the rack 53. Construction and operation of such a steering arrangement are conventional and less concerned with the present invention and therefore are not redundantly described herein. The tie rod 60 in FIG. 2 includes threads 62 in a first end thereof for detachable connection with the ball joint 70 and a second end in the form of a nut type ball joint 61 for detachable connection with the rack 53. The tie rod 60 in FIG. 3 has a structure similar to that in FIG. 2 except that the ball joint 61 in FIG. 3 is of cylinder type rather than nut type and both of which are also conventional.

Figure 4:
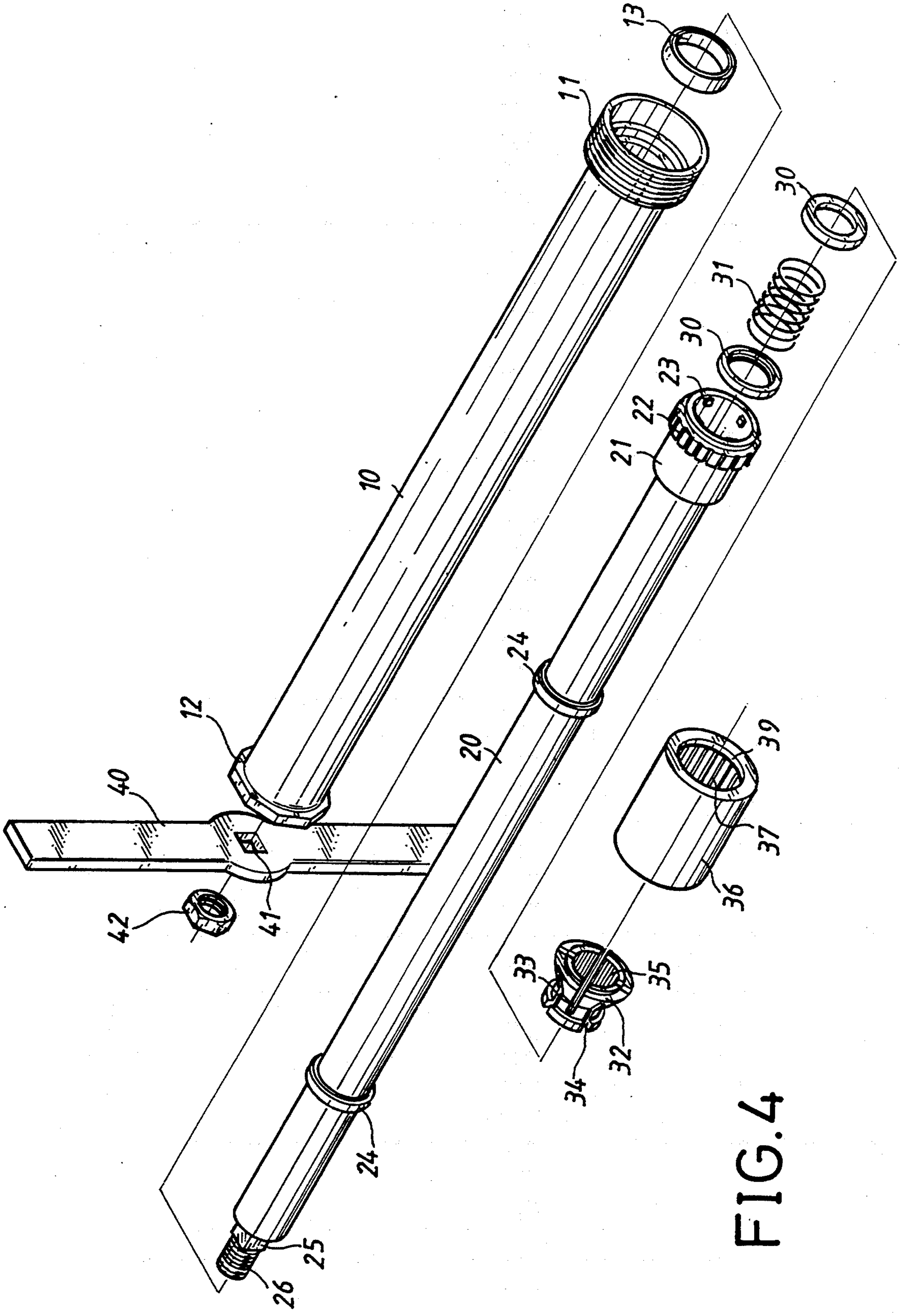
FIG. 4 is an exploded view of a device for mounting-/detaching tie rods in accordance with the present invention.
Figure 5:
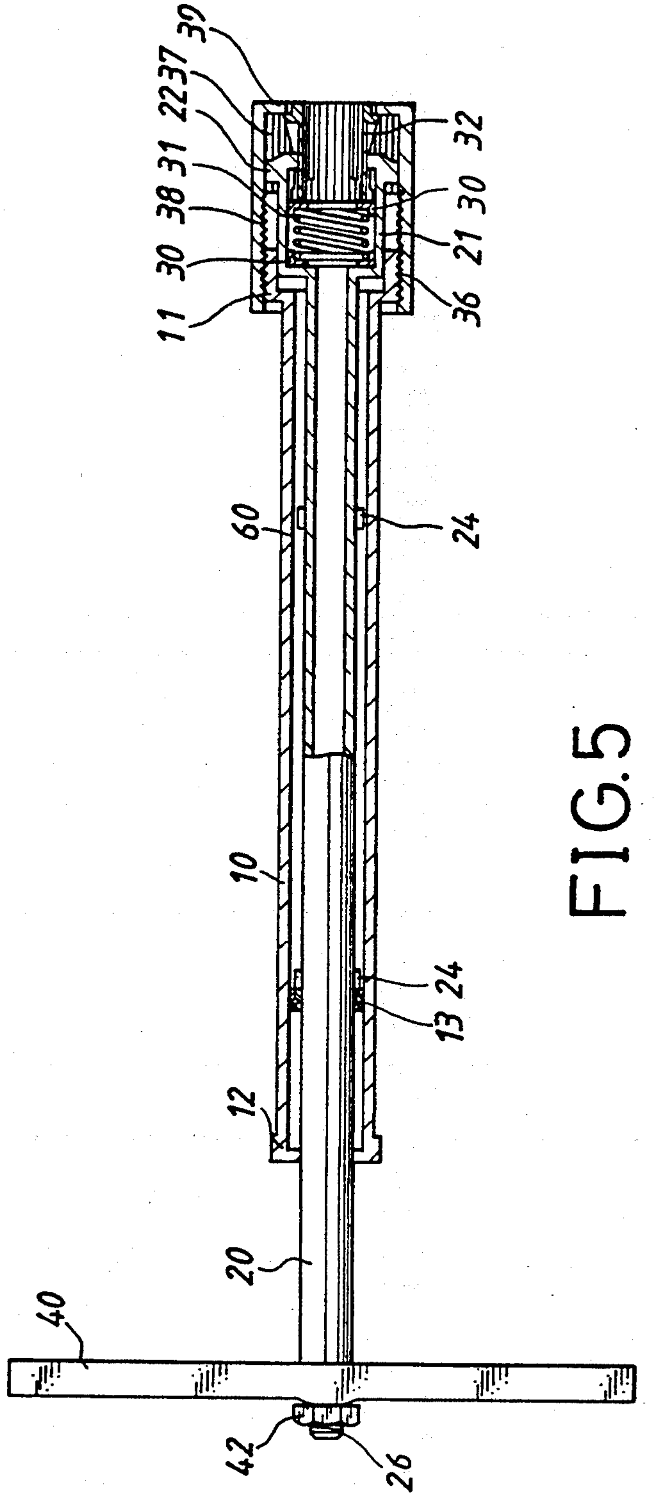
FIG. 5 is a side-elevational view, partly in section, of the device in accordance with the present invention.

Referring to FIGS. 4 and 5, the device for mounting-/detaching the tie rod 60 in accordance with the present invention includes an outer tube 10, an inner tube 20, and an operative member 40. The outer tube 10 includes an enlarged first end 11 with outer threading and a second end on which a nut 12 is formed. The inner tube 20 includes an enlarged first end 21 which is partially received in the first threaded end 11 and a second threaded end 26 which extends beyond the second end of the outer tube 10. The operative member 40 includes a rectangular hole 41 in a mediate section thereof for engaging with an associated rectangular block 25 formed adjacent to the second threaded end 26 of the inner tube 20, whereby the operative member 40 is securely mounted to the second threaded end 26 of the inner tube 20 to rotate therewith.

A flange 22 is formed on the first end 21 of the inner tube 20 and extends beyond the first end 11 of the outer tube 10. The flange 22 further includes a plurality of circumferentially spaced grooves (not labeled) extending along an axial direction of the inner tube 20. Preferably, the flange 22 has an outer diameter the same as that of the first end 11 of the outer tube 10. A plurality of protrusions 23 project inwardly from an inner periphery of and adjacent to an end edge of the first end 21 of the outer tube 20. A compression spring 31 is mounted between two gaskets 30 and are positioned in the first end 21 of the inner tube 20. A substantially funnel-like chuck 32 is also positioned in the first end 21 of the inner tube 20 and includes a relatively smaller end and a relatively larger end with a plurality of circumferentially spaced longitudinal slits 33 formed therein. A plurality of circumferentially spaced guiding grooves 34 are formed in an outer periphery of the chuck 32 and extend from the relatively smaller end to the relatively larger end for engaging with the protrusions 23 on the inner periphery of the first end 21 of the inner tube 20. Preferably, the relatively larger end has a rough inner peripheral surface 35 for catching the ball joint 61 of the tie rod 60 which will be described later.

A sleeve 36 is mounted around the first end 11 of the outer tube 10 and the flange 22 on the first end 21 of the inner tube 20. As can be seen in FIG. 4, the inner periphery of the sleeve 36 includes a channeled section 37 and a threaded section 38 (see FIG. 5). A flange 39 projects inwardly from one end of the sleeve 36 adjacent to the channeled section 37. The channeled section 37 engages with the correspondingly formed flange 22 on the first end 21 of the inner tube 20, such that the sleeve 36 may slide along an axial direction thereof relative to the inner tube 20, and rotational movement therebetween is prohibited. The threaded section 38 engages With the threaded end 11 of the outer tube 10, such that when the outer tube 10 rotates upon operating the nut 12 by a wrench (not shown), the sleeve 36 moves axially on the first end 21 of the inner tube 20, thereby switching the chuck 32 between an opened status and a closed status under travel of the flange 39 so as to release or catch the ball joint 61 of the tie rod 60.

As shown in FIG. 5, the second end 26 of the inner tube 20 extends beyond the second end 12 of the outer tube 10 and the operative member 40 is securely mounted to the second end 26 by a nut 42 as previously described. The first end 21 of the inner tube 20 is partially received in the first end 11 of the outer tube 10, and the spring 31 together with the two gaskets 30 are disposed in the first end 21 of the inner tube 20 in a space beyond the protrusions 23. The flange 22 on the first end 21 of the inner tube 20 locates adjacent to the first end 11 of the outer tube 10. The sleeve 36 is mounted around the first end 11 of the outer tube and the flange 22 of the inner tube 20 as previously described. The chuck 32 is received in the first end 21 of the inner tube 20 with the guiding grooves 34 in the relatively smaller end thereof engaging with the protrusions 23 in the inner periphery of the first end 21 of the inner tube 20 and with the relatively larger cone-shaped end bearing against an inner surface of the flange 39 of the sleeve 36.

Figure 6:
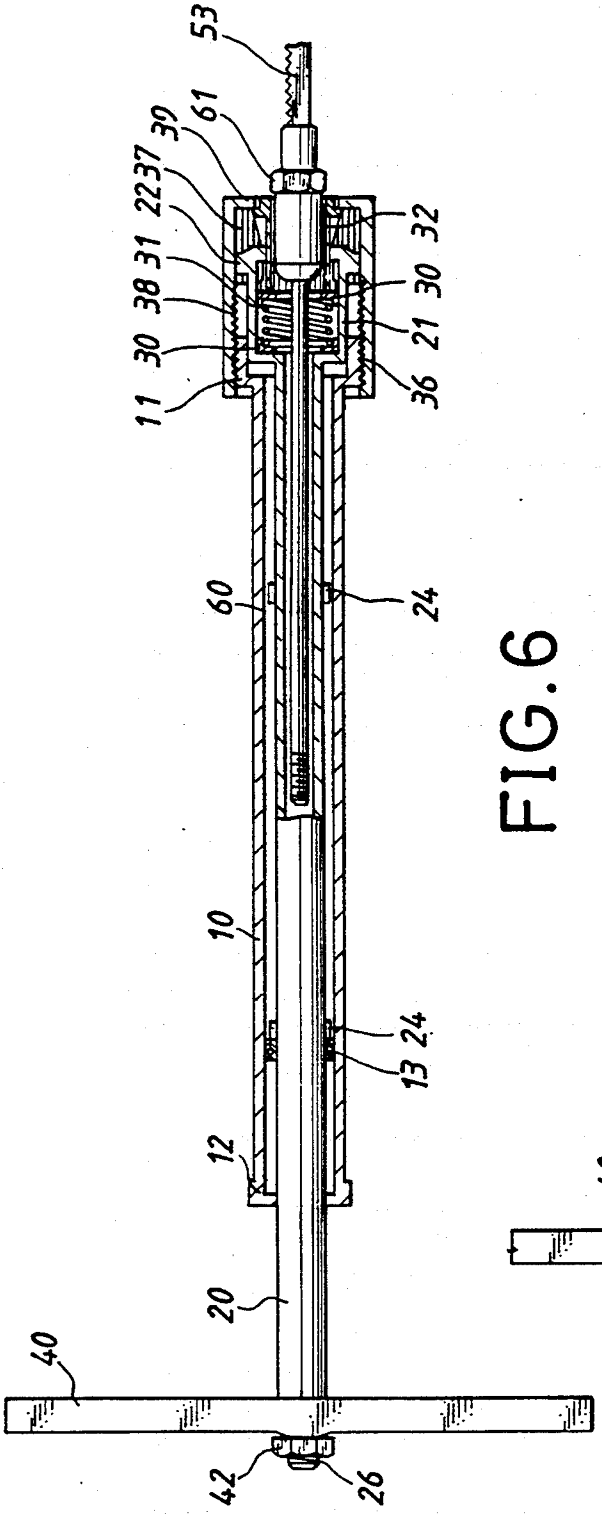
FIGS. 6 and FIG. 7 are partly-sectioned side-elevational views illustrating mounting or detaching of the tie rod.
Figure 7:
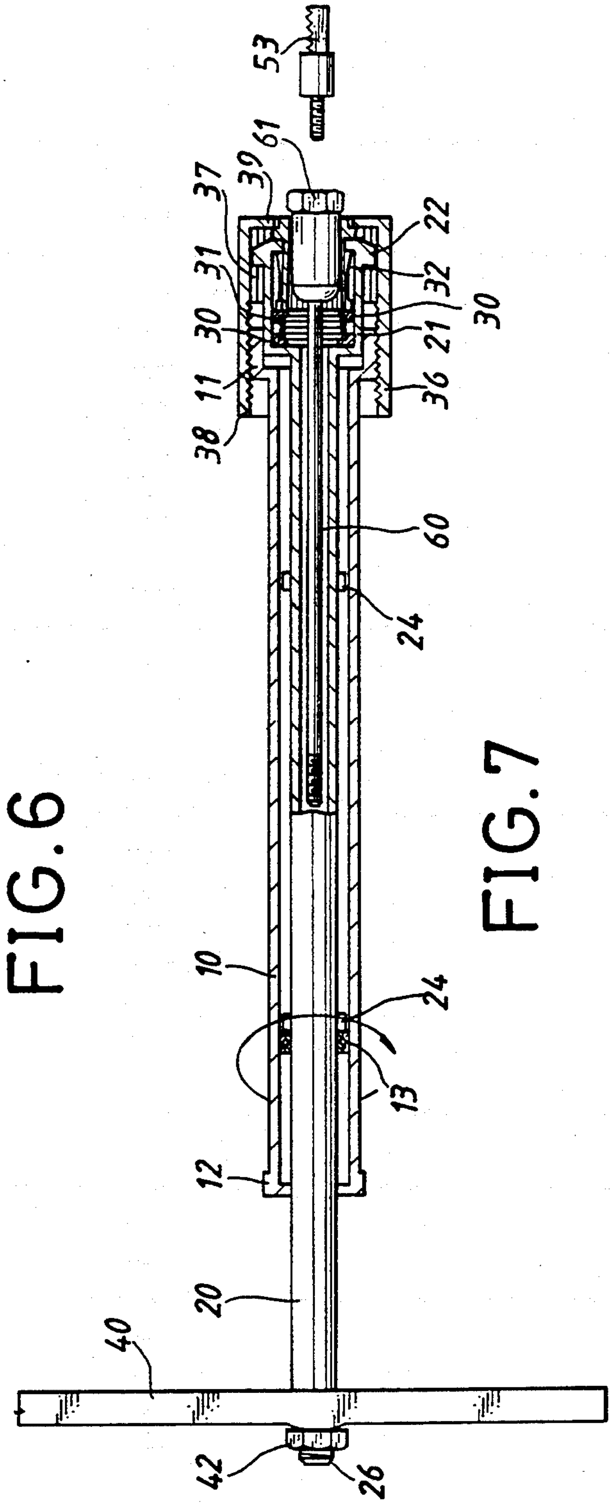

When the tie rod 60 is to be detached from the rack 53, the associated front wheel is firstly removed, then the ball joint 70 is disconnected from the threaded end 62 of the tie rod 60 via an outer side of the associated fender. Thereafter, the protective cover 55 is removed for subsequent disconnection between the tie rod 60 and the rack 53 by means of the device provided by the present invention under the following procedures. Referring now to FIG. 6, the inner tube 20 firstly encompasses the tie rod 60 by means of moving the device (including the inner and outer tubes 10 and 20 as well as the operative member 40) along the tie rod 60 via the relatively small slit mentioned in the background of the invention and via the exposed threaded end 62 thereof until the chuck 32 in the first end 21 of the inner tube 20 encircles the ball joint 61 of the tie rod 60. Then, the outer tube 10 is rotated by means of using a wrench to operate the nut 12, which causes leftward (please follow the direction of FIG. 6) movement of the sleeve 36 as previously mentioned. The flange 39 of the sleeve 36 urges the chuck 32 to move leftwardly during its leftward movement, and during which the protrusions 23 in the first end 21 of the inner tube 20 urge the relatively larger end of the chuck 32 to move inwardly to securely hold the ball joint 61 by the rough inner peripheral surface 35 of the chuck 32. Finally, the operative member 40 is operated to rotate the inner tube 20 in order to disconnect the ball joint 61 and the rack 53, as shown in FIG. 7.

For mounting the tie rod 60, the tie rod 60 is firstly encompassed in the inner tube 20 until the ball joint 61 thereof is received in the chuck 32. Then, the outer tube 10 is rotated (e.g., clockwise) by operating a wrench, such that the sleeve 36 bears against the chuck 32 which, in turn, securely holds the ball joint 61 during its leftward-movement in a manner described in the above paragraph (please note that the spring 31 is compressed). Thereafter, the present device together with the tie rod 60 are passed through said slit mentioned in the background. After the ball joint 61 contacts with an end of the rack 53, the operative member 40 is operated to rotate the inner tube 20 in order to connect the ball joint 61 with the rack 53. Subsequently, the outer tube 10 is rotated in a counterclockwise direction, such that the sleeve 36 moves rightward and that the ball joint 61 is released by the chuck 32 under the action of the spring 31, thereby completing the mounting of the tie rod 60.

Preferably, at least one positioning ring 24 is mounted on a mediate section of the inner tube 20 to position a bearing 13 between the inner and outer tubes 10 and 20 to provide smooth relative rotational movement therebetween.

In brief, rotation of the outer tube 10 by operating the nut 12 may hold or release either type of the ball joint 61 of the tie rod 60, and rotation of the inner tube 20 by operating the operative member 40 may connect or disconnect the tie rod 60 with the rack 53 when either type of the ball joint 61 is securely held by the chuck 32 in the inner tube 20. Such a device allows the maintenance worker to operate via said slit which is more convenient than operation from the space under the engine hood.

Although the invention has been explained in relation to its preferred embodiment, it is to be understood that many other possible modifications and variations can be made without departing from the spirit and scope of the invention as hereinafter claimed.

I claim:

1. A device for mounting/detaching a tie rod of a vehicle steering arrangement, the device comprising:

an outer tube having a first end with a threaded outer periphery and a second end;

an inner tube rotatably received in the outer tube and having a first end partially received in the first end of the outer tube and a second end extending beyond the second end of the outer tube, a chuck being received in the first end of the inner tube for releasably holding an end of a tie rod;

a sleeve mounted around the first end of the outer tube and including an actuating member in one end thereof for effecting opening and closing of the chuck and an inner periphery having a threaded section which engages with the threaded first end of the outer tube, such that when the outer tube rotates, the sleeve moves on the threaded first end of the outer tube along an axial direction of the outer tube to move the chuck between a first position of an opened status and a second position of a closed status; and an operative member securely attached to the second end of the inner tube for rotating the inner tube;

wherein the first end of the inner tube has a plurality of protrusions projecting inwardly from an inner periphery thereof, the chuck includes a relatively smaller end and a relatively larger end and has a plurality of circumferentially spaced guiding grooves formed in an outer periphery thereof and extending from the relatively smaller end to the relatively larger end for engaging with the protrusions on the inner periphery of the first end of the inner tube, the relatively larger end includes a plurality of circumferentially spaced longitudinal slits formed therein and a rough inner peripheral surface for securely holding the end of the tie rod.

2. A device for mounting/detaching a tie rod of a vehicle steering arrangement, the device comprising:

an outer tube having a first end with a threaded outer periphery and a second end;

an inner tube rotatably received in the outer tube and having a first end partially received in the first end of the outer tube and a second end extending beyond the second end of the outer tube, a chuck being received in the first end of the inner tube for releasably holding an end of a tie rod;

a sleeve mounted around the first end of the outer tube and including an actuating member in one end thereof for effecting opening and closing of the chuck and an inner periphery having a threaded section which engages with the threaded first end of the outer tube, such that when the outer tube rotates, the sleeve moves on the threaded first end of the outer tube along an axial direction of the outer tube to move the chuck between a first position of an opened status and a second position of a closed status; and an operative member securely attached to the second end of the inner tube for rotating the inner tube;

wherein the first end of the inner tube includes a flange thereon which extends beyond the first end of the outer tube, the flange includes a plurality of circumferentially spaced grooves extending along an axial direction of the inner tube and having an outer diameter the same as that of the first end of the outer tube; and the inner periphery of the sleeve has a channeled section for engaging with the flange on the first end of the inner tube to prevent rotational movement therebetween.

3. The device as claimed in claim 2 wherein:

the actuating member of the sleeve is a second flange which projects inwardly from one end thereof adjacent to the channeled section.

4. The device as claimed in claim 1 further comprising a compression spring mounted in the first end of the inner tube and positioned adjacent to the chuck.

5. A device for mounting/detaching a tie rod of a vehicle steering arrangement, the device comprising:

an outer tube having a first end with a threaded outer periphery and a second end having a nut formed thereon;

an inner tube rotatably received in the outer tube and having a first end partially received in the first end of the outer tube and a second end extending beyond the second end of the outer tube, a chuck being received in the first end of the inner tube for releasably holding an end of a tie rod;

a sleeve mounted around the first end of the outer tube and including an actuating member in one end thereof for effecting opening and closing of the chuck and an inner periphery having a threaded section which engages with the threaded first end of the outer tube, such that when the outer tube rotates, the sleeve moves on the threaded first end of the outer tube along an axial direction of the outer tube to move the chuck between a first position of an opened status and a second position of a closed status; and an operative member securely attached to the second end of the inner tube for rotating the inner tube.

6. A device for mounting/detaching a tie rod of a vehicle steering arrangement, the device comprising:

an outer tube having a first end with a threaded outer periphery and a second end having a nut formed thereon;

an inner tube rotatably received in the outer tube and having a first end partially received in the first end of the outer tube and a second end extending beyond the second end of the outer tube, a first flange being formed on the first end of the inner tube and extending beyond the first end of the outer tube, the first flange including a plurality of circumferentially spaced grooves extending along an axial direction of the inner tube and having an outer diameter the same as that of the first end of the outer tube, a plurality of protrusions projecting inwardly from an inner periphery of and adjacent to the first end of the outer tube;

a compression spring received in the first end of the inner tube;

a chuck movably received in the first end of the inner tube and including a relatively smaller end with a plurality of circumferentially spaced guiding grooves therein for engaging with the protrusions on the inner periphery of the first end of the inner tube and a relatively larger end with a plurality of circumferentially spaced longitudinal slits formed therein, the relatively larger end having a rough inner peripheral surface for catching an end of a tie rod;

a sleeve mounted around the first end of the outer tube and the flange on the first end of the inner tube, the sleeve including an inner periphery with a channeled section and a threaded section and a second flange projecting inwardly from one end thereof adjacent to the channeled section, the channeled section engaging with the first flange on the first end of the inner tube, such that the sleeve slides along an axial direction thereof relative to the inner tube, and rotational movement therebetween is prohibited, the threaded section engaging with the threaded end of the outer tube, such that when the outer tube rotates, the sleeve moves axially on the first end of the inner tube, thereby axially moving the chuck between a first positioned of an opened status and a second positioned of a closed status under actuation of the first flange; and an operative member securely attached to the second end of the inner tube for rotating the inner tube.

* * * * *